(12) United States Patent
Ogushi et al.

(10) Patent No.: US 6,965,392 B2
(45) Date of Patent: Nov. 15, 2005

(54) IMAGE READING AND RECORDING APPARATUS

(75) Inventors: Hiroshi Ogushi, Chiba-ken (JP); Daigo Nakagawa, Ibaraki-ken (JP); Noriyuki Aoki, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 10/645,578

(22) Filed: Aug. 22, 2003

(65) Prior Publication Data

US 2004/0090474 A1 May 13, 2004

(30) Foreign Application Priority Data

Aug. 26, 2002 (JP) .......................................... 2002-245606
Sep. 5, 2002 (JP) .......................................... 2002-259607

(51) Int. Cl.[7] .............................................. B41J 29/00
(52) U.S. Cl. ........................................ 347/222; 347/263
(58) Field of Search ................................ 347/222, 263, 347/108

(56) References Cited

U.S. PATENT DOCUMENTS 6,078,765 A * 6/2000 Takano et al. .............. 399/124
6,473,152 B1 * 10/2002 Yokota ........................ 355/30

FOREIGN PATENT DOCUMENTS

JP        2001-334648 A      12/2001
JP        2003-48356    *    2/2003    ............ B41J/29/00

* cited by examiner

*Primary Examiner*—Huan Tran
(74) *Attorney, Agent, or Firm*—Fitzpatrick, Cella, Harper & Scinto

(57) ABSTRACT

The present invention relates to an image reading recording apparatus comprising an image reading section for reading an image on an original document, an image recording section for recording an image on a recording medium and a control section for controlling the entire apparatus. The control section is disposed below the image reading section and above the image recording section and disposed on a rear side of an apparatus body.

9 Claims, 18 Drawing Sheets

IMAGE READING AND RECORDING APPARATUS

BACKGROUND OF THE INVENTION

1. Field of the Invention

This invention relates to an image reading and recording apparatus such as a facsimile machine, a photocopier, and a hybrid machine.

2. Description of Related Art

A conventional image reading and recording (hereinafter "reading recording") apparatus has a recording section 602 disposed lower with respect to an image reading section 601 arranged at an upper portion of the apparatus as shown in FIG. 18, and a control substrate 603 and a power supply 604 are disposed at a rear of the recording section 602, or, namely, on a rear side of the control portion 605 disposed at a front side of the apparatus. In the image reading recording apparatus shown in FIG. 18, the feeding direction of the recording sheet is in a direction of arrow H. As shown in Japanese Patent Application Publication No. 2001-334,648, there has been known a structure in which a feeding cassette section is disposed below a printing section, and a sheet is sent to the printing section upon feeding in a U-turn route.

With the image reading apparatus as shown in FIG. 18, because the power supply 604 and the control substrate 603 are provided at the rear of the recording section 602, the apparatus is projected rearward, thereby raising a problem that the installation area of the apparatus becomes larger.

When the image reading apparatus takes a layout as shown in FIG. 18, wires coupling the control substrate 603 with the control portion 605 or the image reading section 601 extend longer because the control substrate 603 is located away from the control portion 605 and the image reading section 601, so that an assembling property is made worse.

With the layout shown in Japanese Patent Application Publication No. 2001-334,648, since a so-called U-turn feeding is used, though no rearward projection is made in comparison with the apparatus shown in FIG. 18, the apparatus height becomes higher due to the thickness of the feeding section performing the U-turn feeding operation, and consequently, there arises a problem that the apparatus becomes larger in size.

SUMMARY OF THE INVENTION

This invention can solve the above problems, and can provide an apparatus with a small installation area without rendering the apparatus height high.

A representative structure of the invention to accomplish the above objects is an image reading recording apparatus including an image reading section for reading an image of an original document, an image recording section for recording an image on a recording medium, and a control section for controlling the entire apparatus, wherein the control section is disposed below the image reading section, above the image recording section, and at a rear side of the apparatus body.

DESCRIPTION OF PREFERRED EMBODIMENTS

Figure 1:
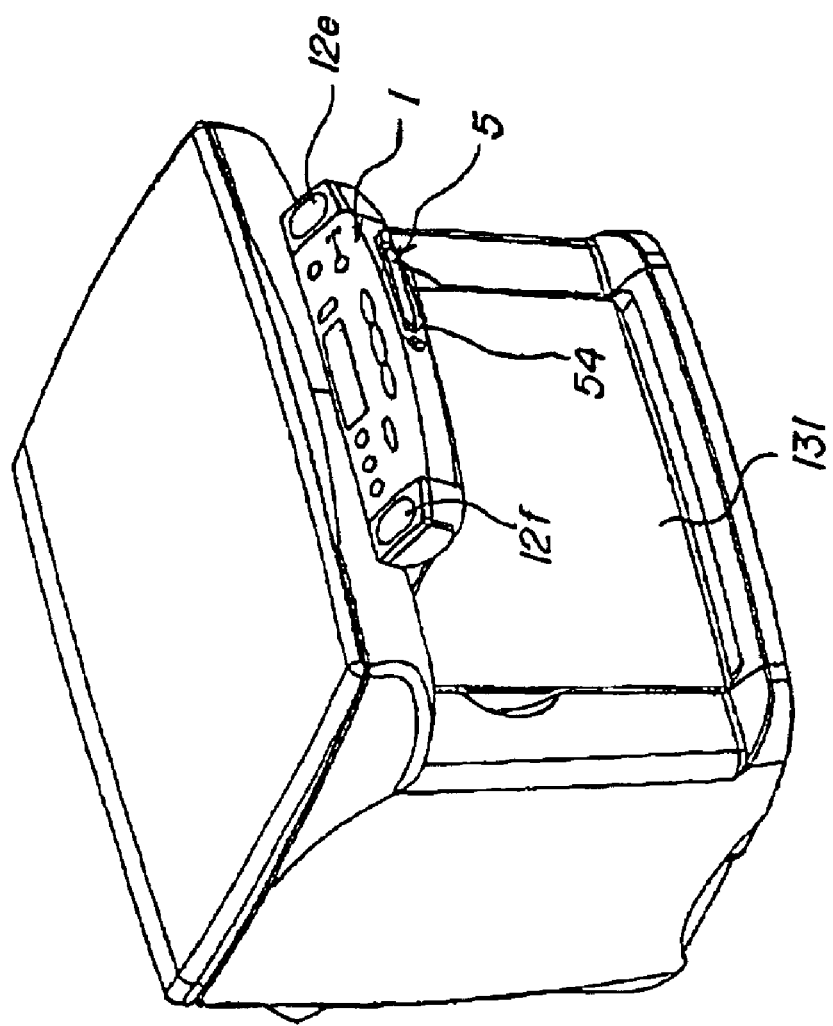
FIG. 1 is a perspective view showing an image reading recording apparatus according to an embodiment of the invention.

Hereinafter, referring to the drawings, preferred embodiments of the invention are exemplified in detail. Size, material, and shape of structural parts set forth in the embodiments below and correlative positions among the parts, etc., can be modified according to the structure of the apparatus to which this invention is applied and to various conditions. The scope of this invention is not to be limited only to those as long as any special description does not exit.

[First Embodiment]

Figure 2:
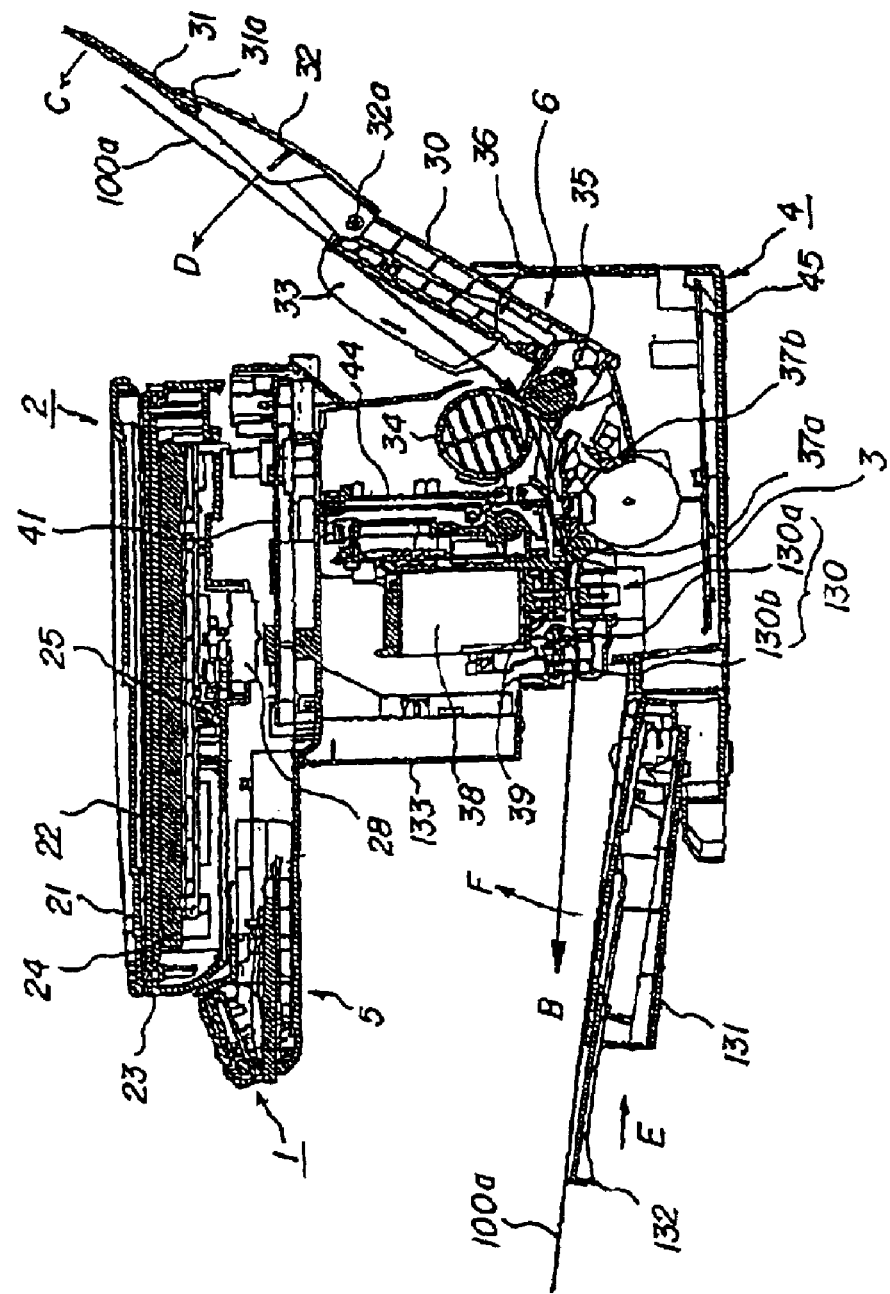
FIG. 2 is a cross-section showing the image reading recording apparatus according to the embodiment of the invention.

Referring to the drawings, an image reading recording apparatus as a first embodiment according to this invention is described. FIG. 1 is a perspective view showing the image reading recording apparatus according to this embodiment;

and FIG. 2 is a center cross-section. The image reading recording apparatus is, as shown in FIG. 1 and FIG. 2, structured of a panel portion 1 serving as a control portion, an image reading section 2 as an image reading means, a recording section 3 serving as an image forming means, an electrical substrate portion 4, a card slot portion 5 as an inserting portion for an electronic device in a card shape, and a feeding section 6 for feeding recording paper to the recording section 3.

Figure 3:
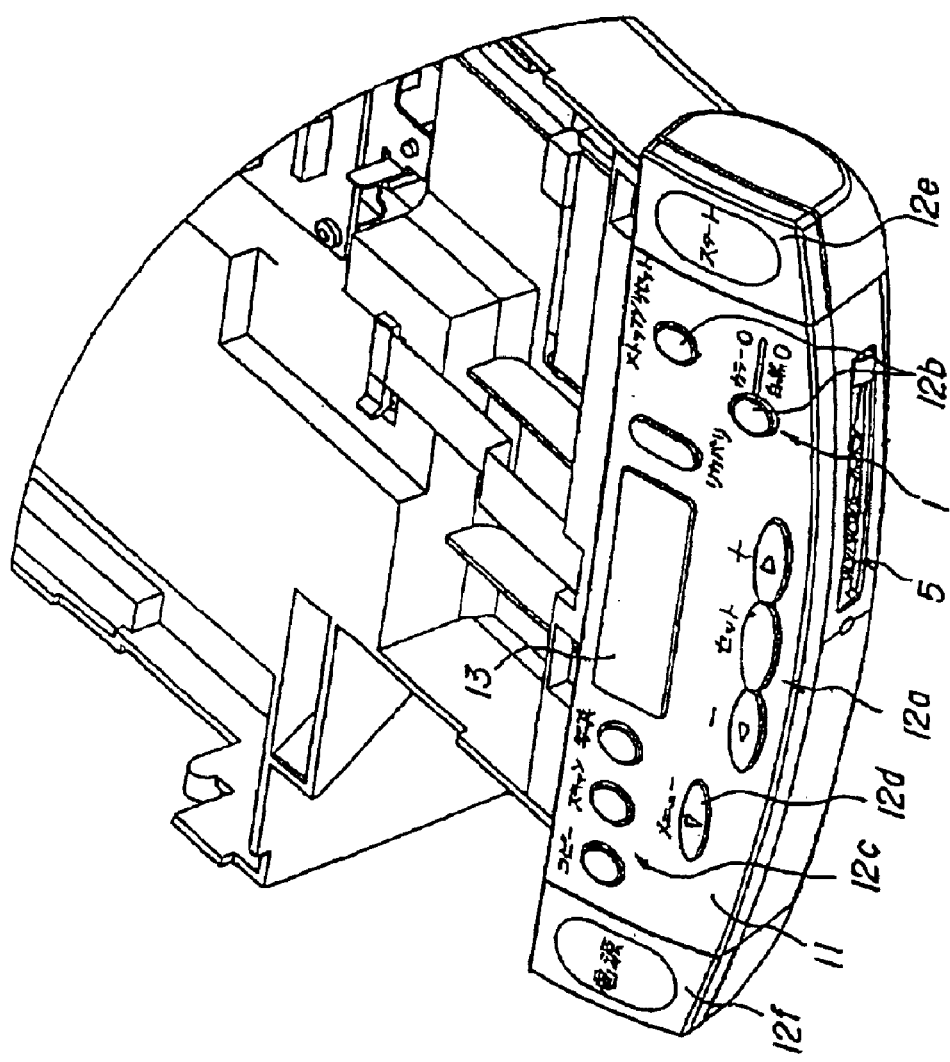
FIG. 3 is an enlarged view showing a panel portion of the image reading recording apparatus according to an embodiment of the invention.
Figure 4:
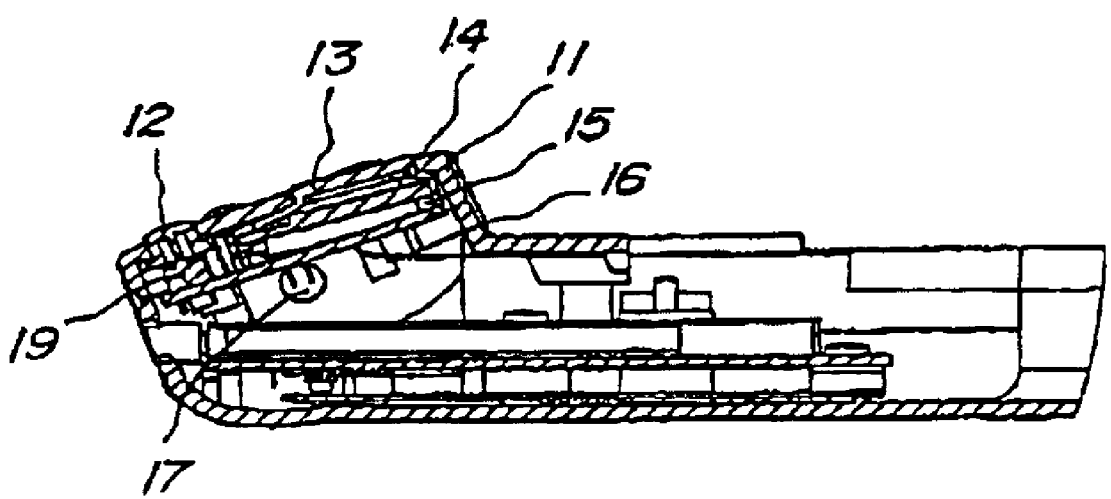
FIG. 4 is a cross-section showing the panel portion of the image reading recording apparatus according to an embodiment of the invention.
Figure 5:
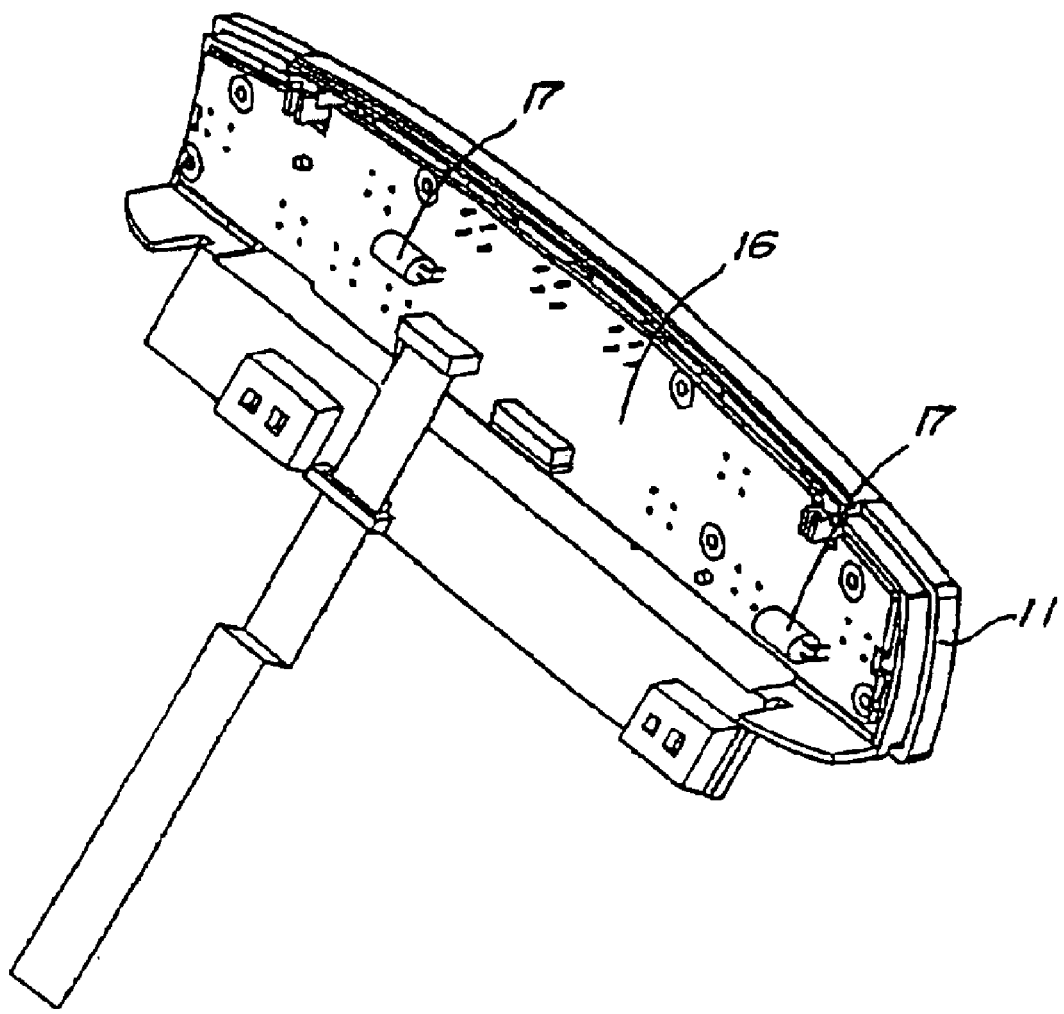
FIG. 5 is a rear view showing the panel portion of the image reading recording apparatus according to an embodiment of the invention.

First, the panel portion 1 as a control portion is described. FIG. 3 is a magnified perspective view showing the panel portion; FIG. 4 is a cross-section partly showing a panel portion and the vicinity; and FIG. 5 is a rear view showing a panel unit.

As shown in the drawings, the panel portion 1 is arranged as projecting from the apparatus body. In the panel portion 1, various keys are fitted into a panel cover 11 as a structure, and a panel substrate 16 is secured with screws. It is to be noted that the keys 12a, 12b, 12c are structured as a united body at a portion (not shown). A tact switch 19 is soldered below the respective keys 12 on the panel substrate 16. An LCD 14 is attached to the panel substrate 16 via a spacer 15. An LCD window 13 is attached on the LCD 14. An electrolytic capacitor 17 is soldered on a rear surface of the panel substrate 16.

Next, the card slot portion 5 is described. As shown in FIG. 1, the card slot portion 5 is connected to a lower side of the panel portion 1, and is disposed on a front surface of the apparatus body where the panel portion 1 is located on the front surface of the apparatus body. As shown in FIG. 2, the card slot portion 5 is arranged below the image reading section 2 and above the image forming section 3. A location below the image reading section 2 means a location below a surface including the lowest point of the image reading section 2, and a location above the image forming section 3 means a location above a surface including a topmost point of the image forming section 3. The arrangement of the card slot portion 5 below the image reading section 2 and above the image forming section 3 renders the controllability improved because an electronic device in a card shape such as a PC card or the like can be detachably attached easily to the card slot portion 5.

Figure 6:
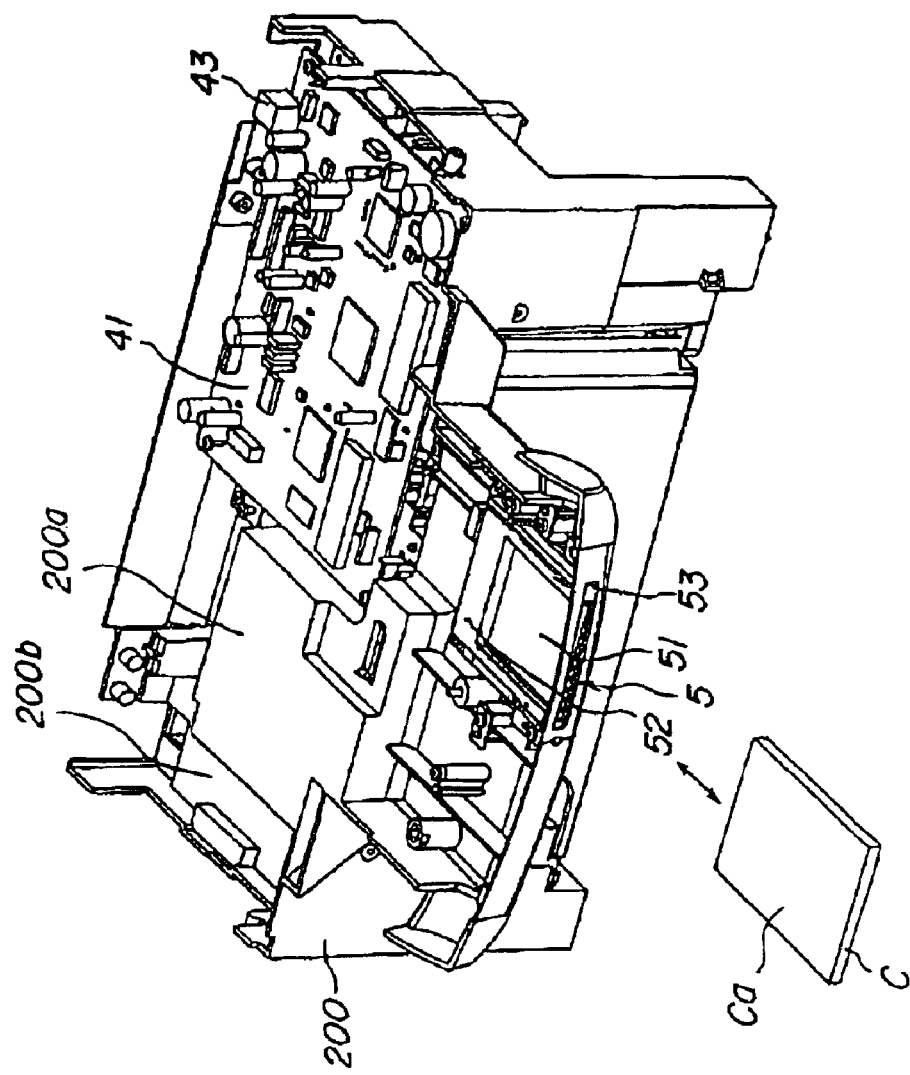
FIG. 6 is an attachment illustration showing an electrical substrate of the image reading recording apparatus according to an embodiment of the invention.

FIG. 6 is a diagram depicting the panel portion 1 being attached. The card slot portion 5 is structured of a card substrate 51, a card connector 52, and an eject button 53. A PC card C as an electronic device in a card shape can be inserted through an inlet 54 opened at a top of the apparatus body. The inserted PC card C can be detached by pushing the eject button 53. As shown in FIG. 6, the card slot 5 is arranged to enable inserting and pulling out the PC card C so that the card surface Ca of the PC card becomes approximately parallel to the horizontal surface.

As such an electronic device in a card shape, exemplified are cards in compliance with the PCMCIA (Personal Computer Memory Card International Association) standard, as well as various memory cards such as Compact Flash (trademark), Smart Media (trademark), Memory Stick (trademark), and SD (Secure Digital) card, I/O cards, and electronic devices having adaptors for respective memory cards.

The card slot portion 5 can make direct recording from the recording section 3 upon reading images or the like of a digital camera through the PC card and can read and write the memory card upon directly connecting to a personal computer (hereinafter referred to as "PC").

It is to be noted that other electronic devices in a card shape can be inserted in and pulled out of the card slot portion 5 so long as thet have substantially the same structure as the PC card.

Figure 7:
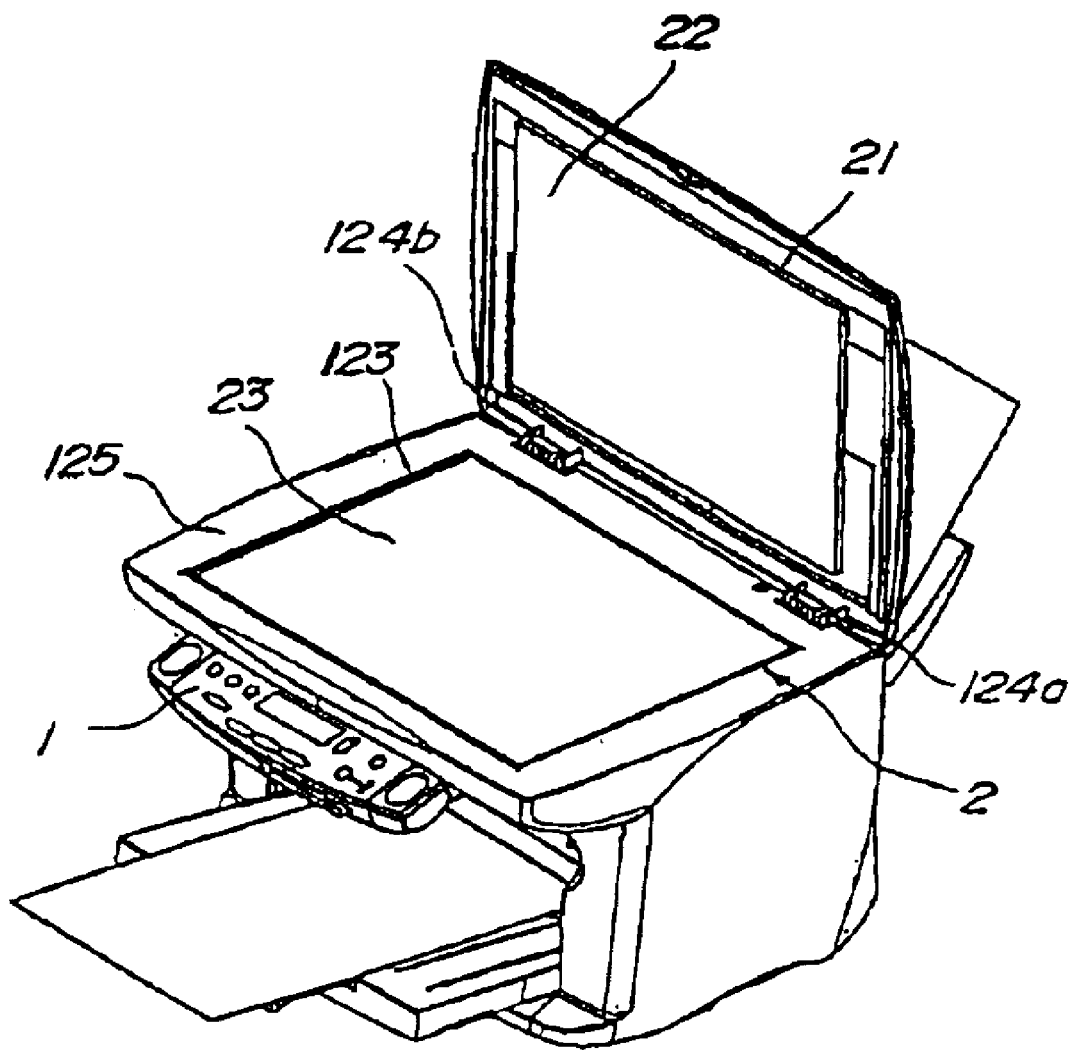
FIG. 7 is a status illustration showing an opened pressing plate of the image reading recording apparatus according to an embodiment of the invention.

Next, the image reading section 2 is described. FIG. 7 is an illustration showing an apparatus body when the original document is set, and the original document is set in the upside down manner on a glass 23 serving as an original document setting portion arranged at the image reading section 2 to read the images on the original document. As shown in FIG. 7, a hitting reference white 123 is adhered to the image reading section 2 on a top side of the glass 23 to which the original document is set in the upside down manner. The hitting reference white 123 plays a role as a hitting portion to the edge of the original documents and at the same time as the absolute white reference for reading from the back side via the glass 23. The glass 23 is pushed from an upper side with a cover 125. A pressing plate 21 for suppressing a floating of the original document and a pressing plate white sheet 22 structured of a sponge and a white sheet are attached to each other via hinges 124a, 124b.

Figure 8:
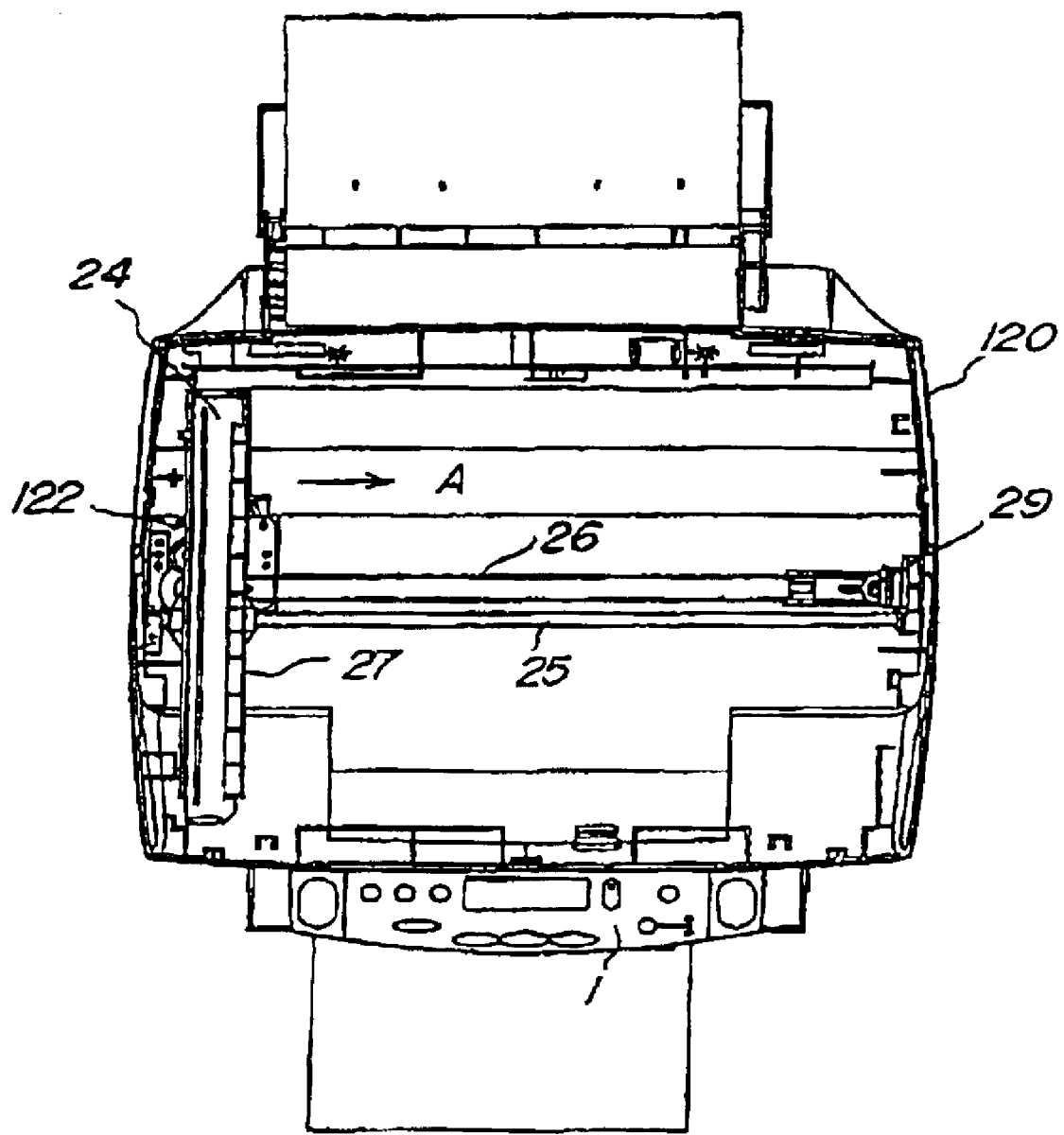
FIG. 8 is a structural diagram showing an image reading section of the image reading recording apparatus according to an embodiment of the invention.

FIG. 8 illustrates an inner structure of the image reading portion 2 where the glass 23 and the cover 125 are detached from the state shown in FIG. 7. A CIS holder 27 holding a contact sensor (hereinafter, referred to as "CIS") 24 for reading images is guided and movable on an axis 25. The CIS holder 27 is driven via a timing belt 26 by a motor 28 (see, FIG. 1) as a drive force source and decelerated at a drive gear portion 122. The timing belt 26 is suspended by a pulley 29 located in opposition to the drive gear portion 122. The drive gear portion 122 and the pulley 29 are attached to a scanner frame 120. In operation of those parts, during the photocopying operation or the scanning operation from the PC, the CIS 24 and the CIS holder 27 are driven in a direction of arrow A in FIG. 8, and the images of the original document are read via the glass 23.

Figure 9:
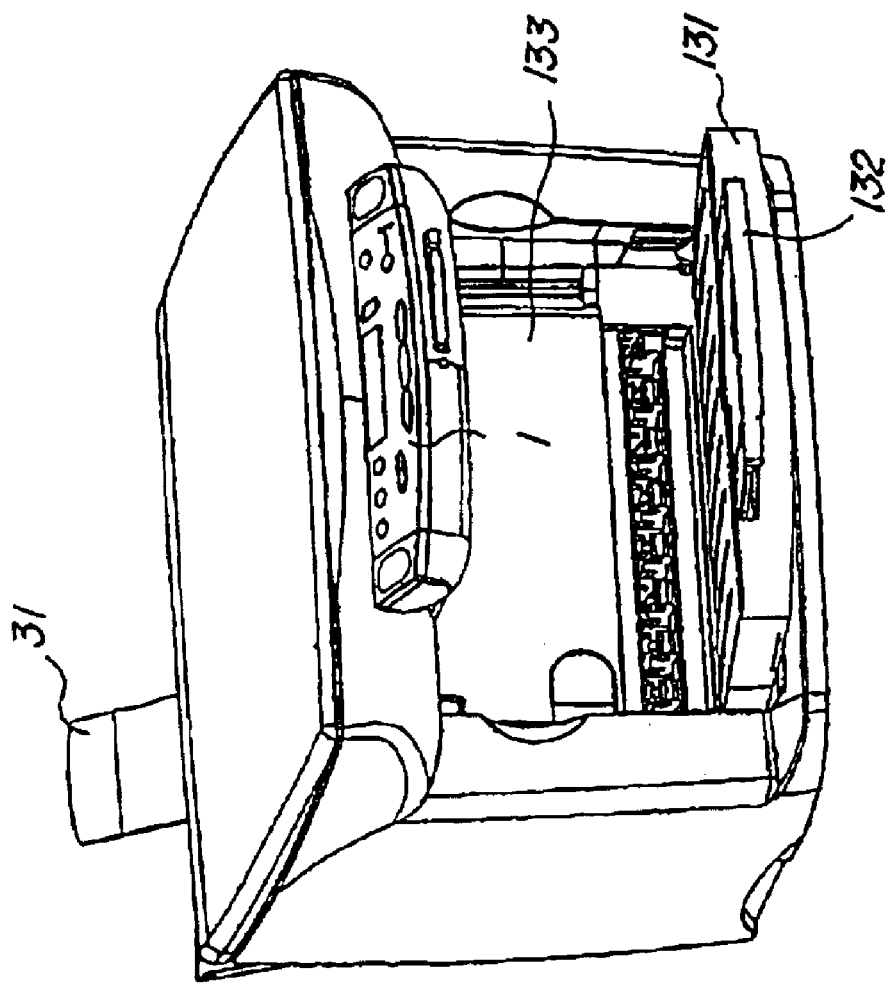
FIG. 9 is an appearance diagram showing an open state of a tray of the image reading recording apparatus according to an embodiment of the invention.
Figure 10:
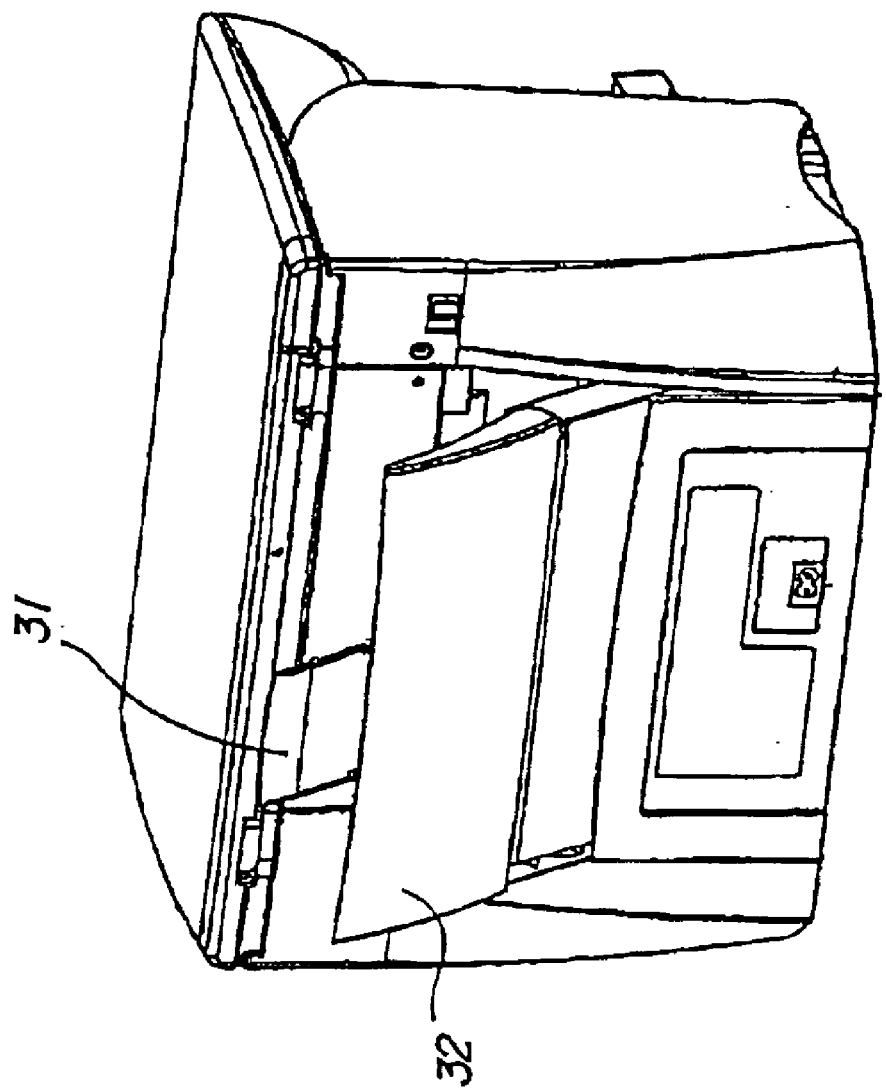
FIG. 10 is a rear side appearance diagram showing the open state of the tray of the image reading recording apparatus according to an embodiment of the invention.
Figure 11:
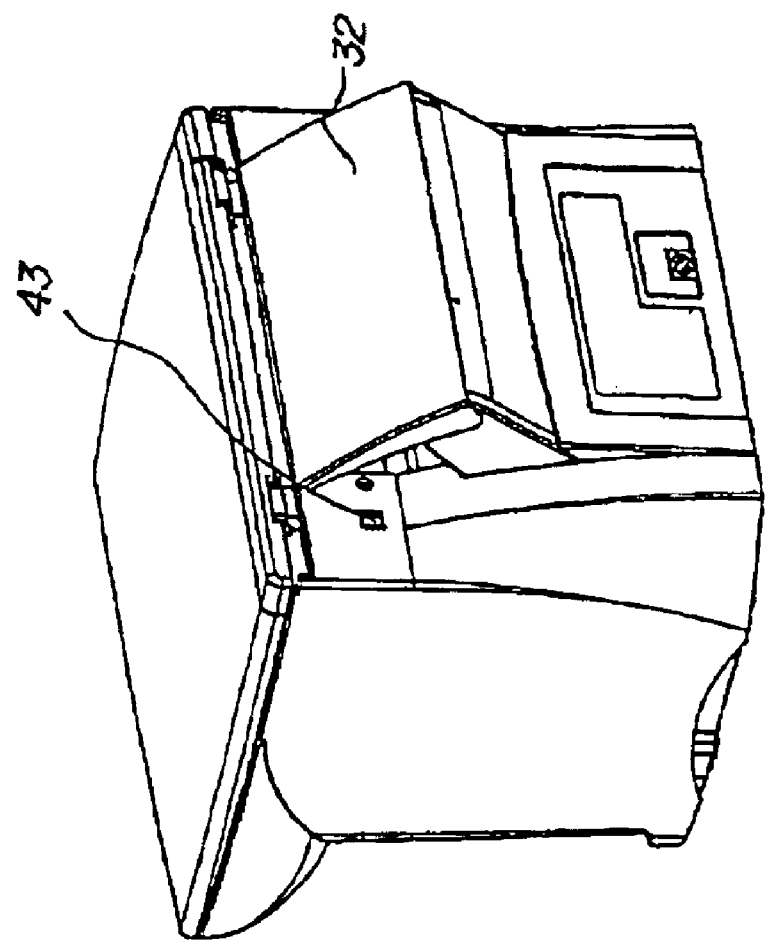
FIG. 11 is a rear side appearance diagram showing the closed state of the tray of the image reading recording apparatus according to an embodiment of the invention.

Subsequently, the recording section 3 and the automatic sheet feeder (ASF) 6 are described. As shown in FIG. 2, recording sheets 100a as recording media are conveyed in a direction of arrow B. FIG. 9 is an illustration showing a state that the tray and the like are opened, and will now be explained together with FIG. 2. A front end of the recording sheet 100a set in the ASF base 20 and an intermediate plate 36 is held with a recording sheet tray 32 and a recording sheet auxiliary tray 31. The edges of the recording sheet 100a are guided by a slider member 33 capable of sliding in a right and left direction (width direction substantially perpendicular to the conveyance direction), and the sheets are conveyed while being prevented from being conveyed obliquely with the slider 33. The recording sheet auxiliary tray 31 is rotatable in a direction of arrow C in FIG. 2 around a hinge 31a as a center and can be contained in the recording sheet tray 32. The recording sheet tray 32 is rotatable in a direction of arrow D in FIG. 2 around a hinge 32a and can rotate until hitting the apparatus body. FIG. 10 is a view showing the apparatus in a state that the tray is opened when viewed from the rear side; and FIG. 11 is a view showing the apparatus in a state that the tray is closed when viewed from the rear side. The opening and closing operations of the recording sheet tray 32 do not interfere with opening and closing operations of the pressing plate 21 in FIG. 7, and these can be opened and closed even in any angle state. Because the recording sheet tray 32 can be folded in the above manner, the apparatus can be made compact without having any projection when not used generally, and entry of dust or the like into the feeding section 6 or the like can be prevented.

The recording sheets 100a stacked on the ASF base 30 and the intermediate plate 36 are fed upon being separated sheet by sheet by a feeding roller 34 and a separation roller 35 where the intermediate plate 36 is pushed up by a cam (not shown). In this separation mechanism, what is actually driven is the feeding roller 34, and the separation roller 35 does not rotate unless exerted with a torque at a prescribed amount or more in the rotational direction. Therefore, when plural recording sheets are entered into the rollers 34, 35, the recording sheets can be conveyed sheet by sheet because the force rotating the separation roller 35 is stronger than the force separating the recording sheets. The recording sheets thus separated and fed by the feeding section structured of those rollers are conveyed between a conveyance roller 37*a* and a pinch roller 37*b*, and conveyed to the recording section 3 at a constant rate.

Figure 12:
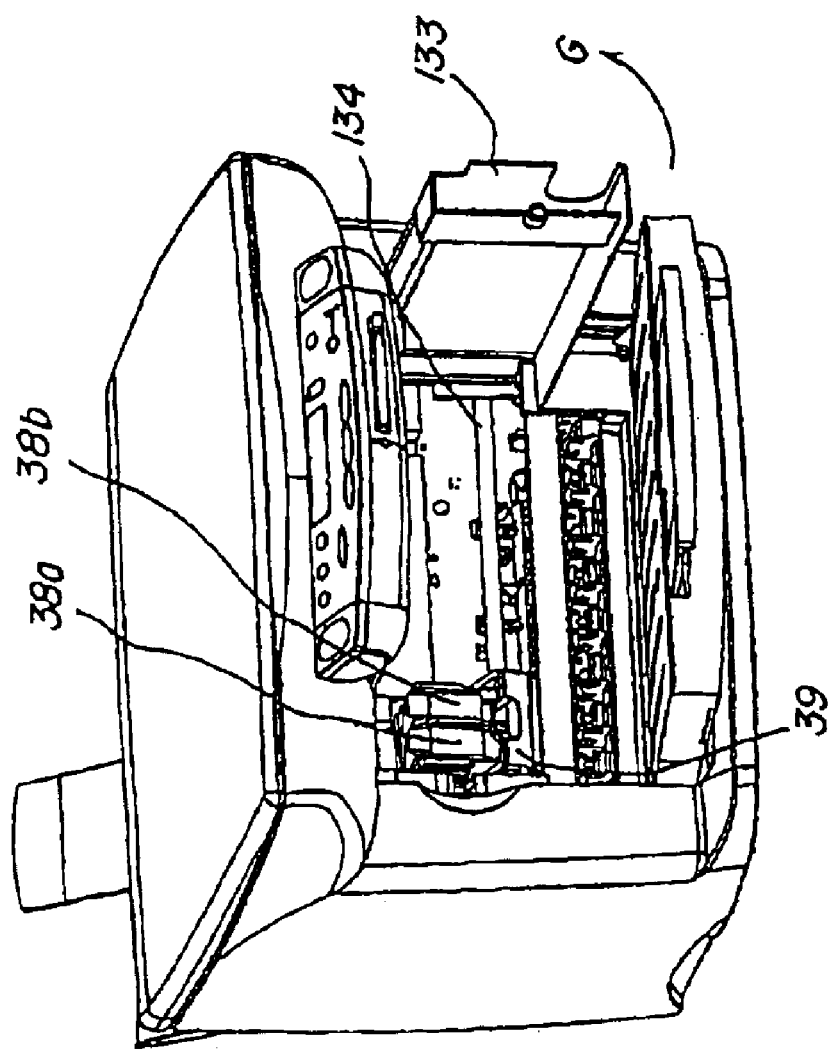
FIG. 12 is an appearance diagram showing an open state of a cartridge door of the image reading recording apparatus according to an embodiment of the invention.
Figure 13:
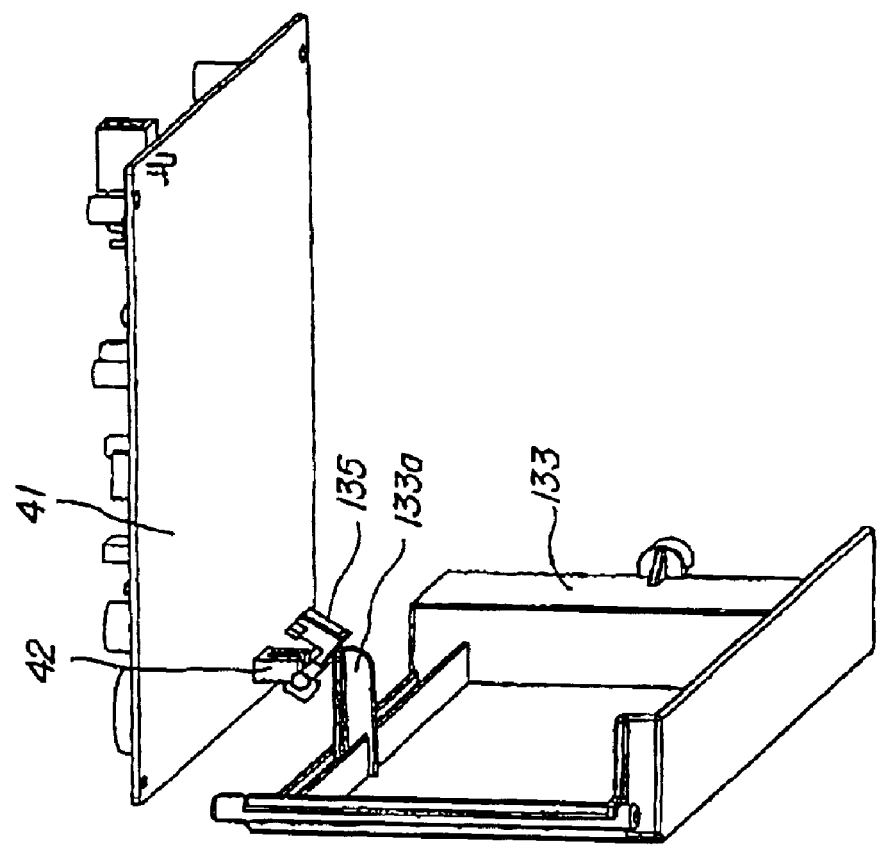
FIG. 13 is a sensor layout of the cartridge door of the image reading recording apparatus according to an embodiment of the invention.

FIG. 12 is a perspective view showing the apparatus in a state that a cartridge door 133 is opened when viewed from a front side of the apparatus. A cartridge 39, a color ink tank 38*a*, and a black ink tank 38*b*, which form the recording head in a united body, are attached in the recording section 3. The cartridge 39 is guided by a guide shaft 134 and records images on the recording sheets by reciprocal movements in a direction substantially perpendicular to the feeding direction of the recording sheet. The recording sheet on which images are recorded is delivered to a recording sheet delivery tray 131 and a recording sheet delivery auxiliary tray 132 by a delivery roller pair 130. It is to be noted that the user can generally replace the ink tanks 38*a*, 38*b* from the exterior by opening the cartridge door 133 in a direction of arrow G in FIG. 12. A projection 133*a* as shown in FIG. 13 is provided at the cartridge door 133, and pushes an actuator 135 according to the opening and closing operation of the door 133, thereby interrupting a photo-interrupter 42 mounted on the back of a control substrate 41 to detect the opened and closed state of the cartridge door 133. It is to be noted that the cartridge 39 normally escapes on right rear side in FIG. 12 to prevent the head portion of the cartridge 39 from drying, and when opening of the cartridge door 138 is detected, the cartridge 39 moves to a position that the user can replace the ink tank 38 (a position shown in FIG. 12).

With the recording sheet delivery tray 131 and the recording sheet delivery auxiliary tray 132, the recording sheet delivery auxiliary tray 132 can be contained in the recording sheet delivery tray 131 upon sliding in a direction of arrow E in FIG. 2 when no recording is made. The recording sheet delivery tray 131 can be closed in a direction of arrow F in FIG. 2, and can finally be set as shown in FIG. 1. Conversely, to replace the ink cartridge 38 from the state as shown in FIG. 1, first, the recording sheet delivery tray 131 is opened in a direction reverse to arrow F in FIG. 2 to render the apparatus in a state shown in FIG. 9, thereby allowing maintenance such as replacements by opening the cartridge door 133 in a direction of arrow G in FIG. 12. The cartridge door 133 has an open and closed direction extending in a direction of arrow G (lateral direction) in FIG. 12 different from that of the recording sheet delivery tray 131, so that the apparatus has an advantage that a manipulation space is formed widely in front of the cartridge 39.

The recording section 3 used in this embodiment employs an ink-jet recording method, and has a plurality of recording heads for recording in respective colored inks. It employs a method in which the recording section 3 has a means for generating thermal energy as energy utilized for discharging ink, e.g., an electro-thermal converter or laser beam, and in which the thermal energy induces phase changes in the inks, and according to such a method, recording can be made with high density and high definition.

Figure 14:
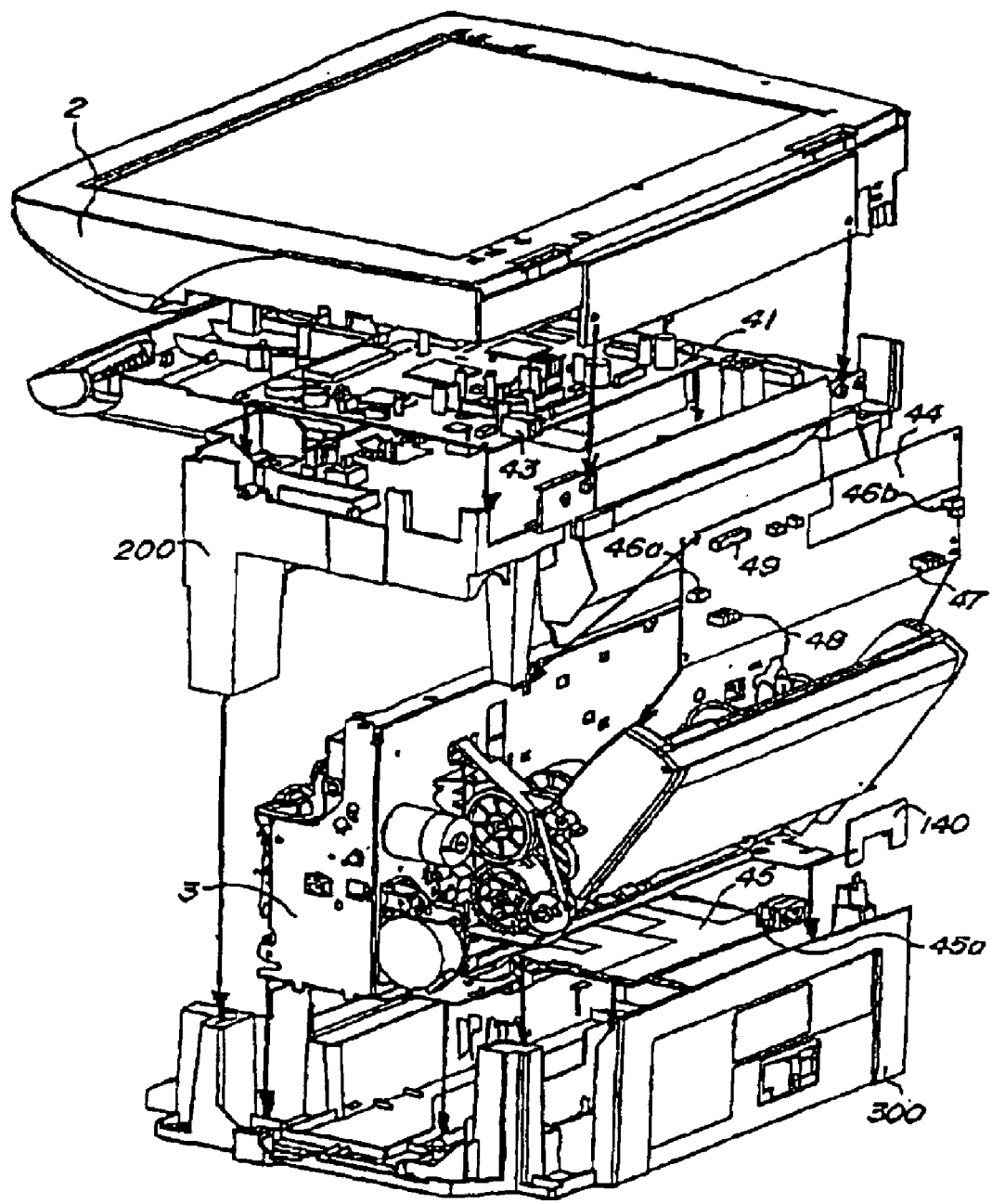
FIG. 14 is a layout assembling illustration showing the electrical substrate of the image reading recording apparatus according to an embodiment of the invention.

Next, the electrical substrate 4 is described. FIG. 14 is a diagram showing the entire structure of the electrical substrate and the structure of the vicinity. A power supply 45 is attached to a bottom casing 300, and the recording section 3 is attached thereon. That is, in this recording section 3, the feeding section is disposed on a rear side of the apparatus for sequentially feeding the recording sheets one by one to the recording section 3, and the power supply 45 as a power supply portion is disposed approximately below the feeding section. With this layout, the installation area of the apparatus can be reduced without increasing the height of the apparatus.

Figure 17:
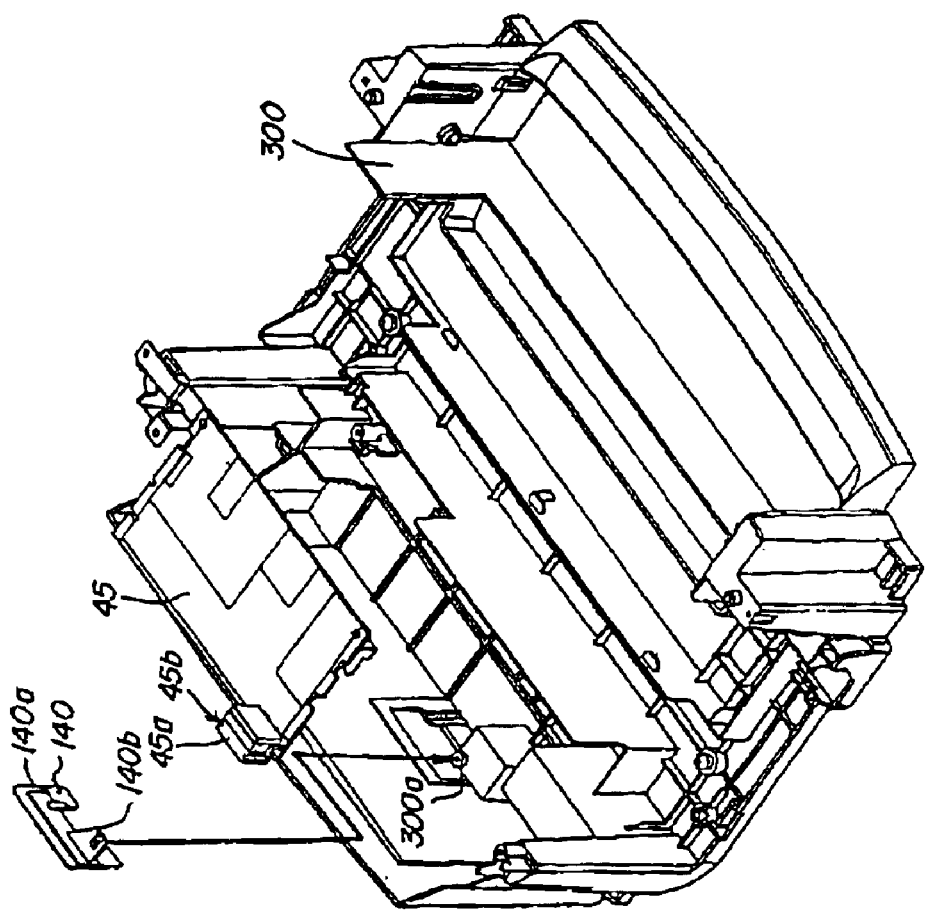
FIG. 17 is a detailed diagram showing a power supply of the image reading recording apparatus according to an embodiment of the invention.
Figure 18:
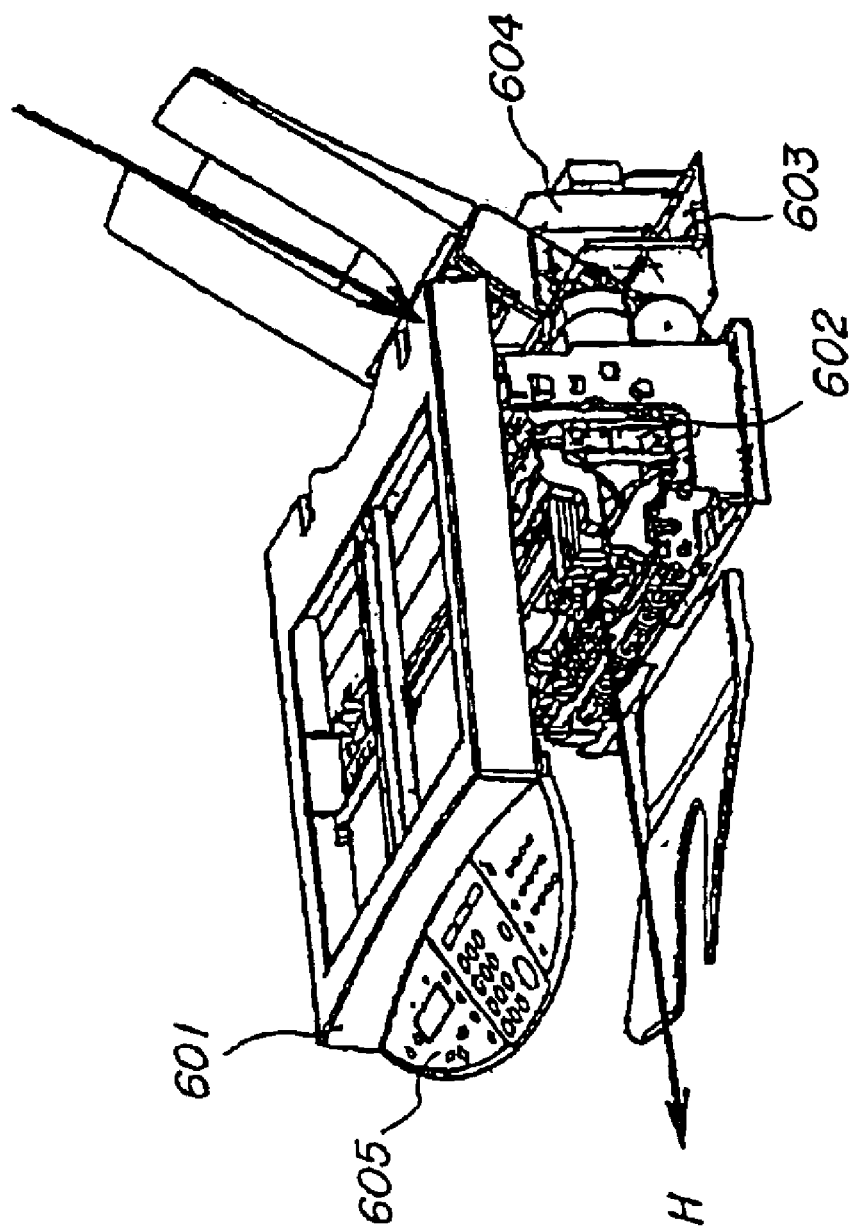
FIG. 18 is a perspective view showing an image reading recording apparatus according to the prior art.

An electrical cord is attached to an inlet 45*a* of the power supply 45 from the exterior. Because force peeling off from the substrate may be exerted to a proximal end of the inlet 45*a* when the cord is pulled out or inserted, a power supply window 140 is provided and directly secured with screws to the bottom casing 300. More specifically, as shown in a detailed diagram of the power supply section in FIG. 17, an end of the power supply window 140*a* enters in an inlet groove 45*b*, and a power supply window hole 140*b* and a bottom casing screw hole 300*a* are secured via a screw. Connectors 46*a*, 46*b* of the motor for the recording section 3, a photo-interrupter 47 detecting the position of the recording sheet, and a photo-interrupter 48 detecting the position of the cam pushing down the intermediate plate 36 are mounted on a relay substrate 44, and those are coupled integrally via a connector 49 to the control substrate 41 as a control portion described below. This allows the connection to the control substrate 41 to be concentrated, so that assembling can be made easily.

Figure 15:
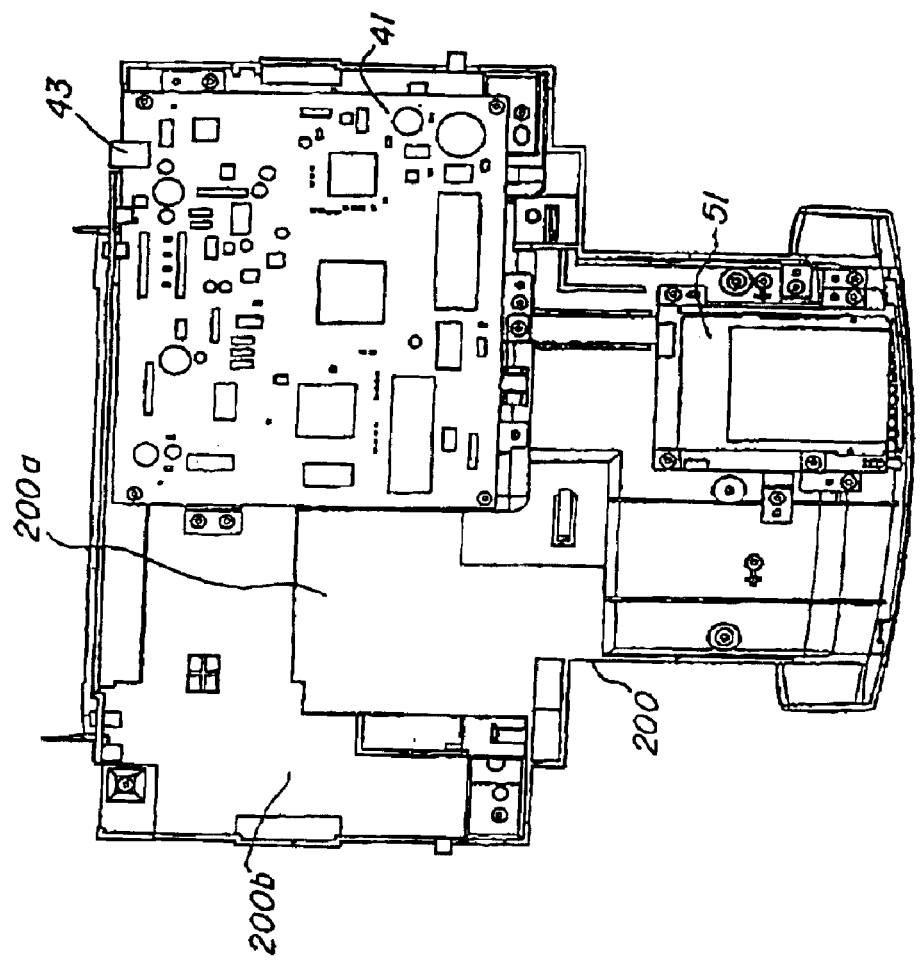
FIG. 15 is a plan view showing the attachment of the electrical substrate of the image reading recording apparatus according to an embodiment of the invention.

A middle frame 200 is attached on the recording section 3, and the control substrate 41 and the card substrate 51 of the card slot portion 5 described above are attached to the middle frame 200 at substantially the same level to each other (see, FIG. 6, FIG. 15). The control substrate 41 is a control portion for controlling the entire apparatus, and is attached between the image reading section 2 disposed on an upper side of the apparatus and the image recording section 3 disposed on a lower side of the apparatus as well as disposed on a rear side of the apparatus body. The rear side of the apparatus body where the control substrate 41 is formed means a rear position of the apparatus body where a side formed with the panel portion 1 is defined as a front side of the apparatus. With this layout, the installation area of the apparatus can be reduced without increasing the apparatus height.

A USB connector is attached to the control substrate 41, and positionally corresponds with an opening of the rear cover. An interface is attached to the control substrate 41 for coupling the card slot portion 5, and the images written in the PC card inserted in the card slot portion 5 can be directly printed out from the recording section 3.

Figure 16:
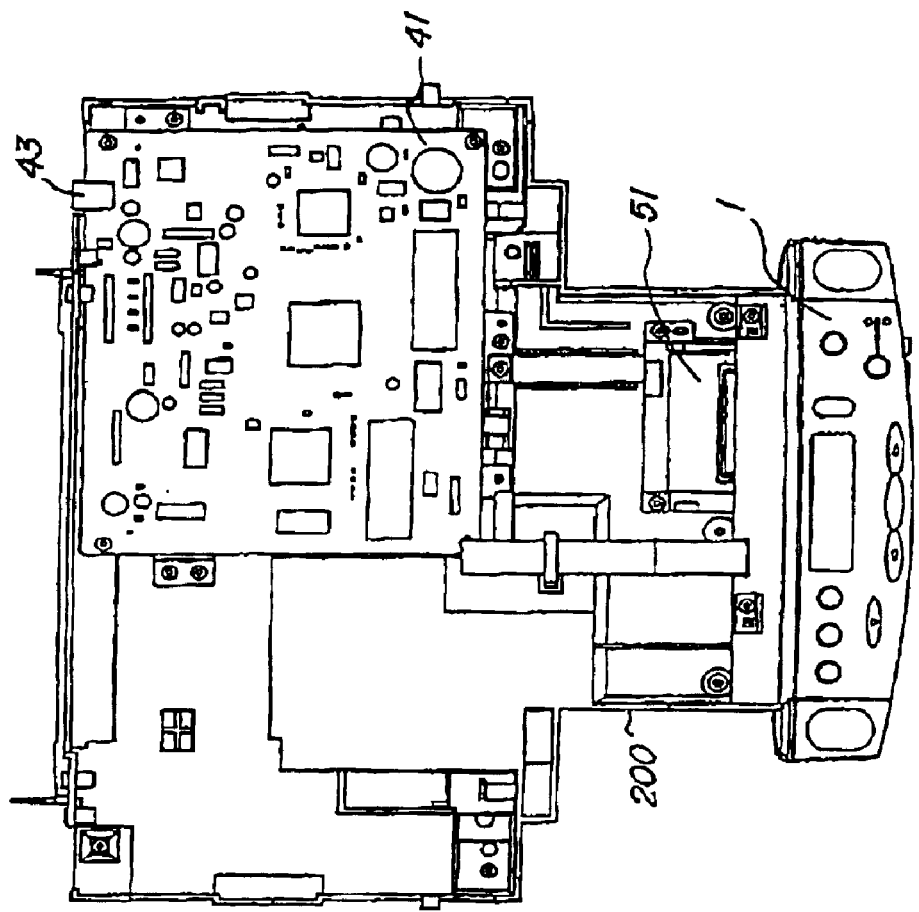
FIG. 16 is a status diagram showing the attachment of the electrical substrate and a panel portion of the image reading recording apparatus according to an embodiment of the invention.

As shown in FIG. 16, the control substrate 41 is disposed around the card substrate 51, so that connection lines or the like for coupling between the control substrate 41 and the card substrate 51 can be easily assembled, and so that images can be outputted with high quality because noises are unlikely added on the connection lines or the like from the other parts.

The right end 200*a* of the middle frame 200 is, as shown in FIG. 6 and FIG. 15, lifted from the attachment level of the substrate. This is a position right above the replacement position of the cartridge 36 when the ink tank 38 is replaced, and where the ceiling above the cartridge 39 is made higher, the manipulation space for ink tank replacement work can be ensured. The left end 200*b* of the middle frame 200 is at the same level as the attachment level of the substrate. This is for ensuring the space for containing the drive gear portion 122 projecting below the reading section 2 attached on the middle frame 200. FIG. 16 is a diagram showing the apparatus in FIG. 15 with an attachment of the panel portion 1. The panel portion 1 serving as a control portion is arranged substantially right above the card slot portion 5. That is, as shown in FIG. 16, the panel portion 1 as the control portion is disposed in front of the control substrate as the control portion. This renders the connection between the panel portion 1 and the control substrate 41 easy.

As described above, where the control substrate and the like are arranged, the reading section 2 can be contained from the upper side thereof. With the electric substrate 4 arranged as described above, little useless space is formed, and the layout can be effective and easily used. The distance between the card substrate 51 of the card slot portion 5 and the control substrate 41 is short, and the wires connecting between the substrates can be short, so that the apparatus can be assembled easily with durable property against noises.

An example of the operation of the image reading recording apparatus is described. The apparatus is operated upon controlling the keys on the panel portion 1 shown in FIG. 1. For example, the manipulation for the photocopying operation is described in FIG. 3. First, a power supply key 12f forming an end of the panel portion 1 is pushed. A copy key is subsequently selected through a function key 12c. Image quality and media for recording are selected with a menu key 12d, and the number of copying sheets is set with arrow keys of a key 12c. Color copying or monochrome copying is selected with the color selection key 12b. Then, the pressing plate 21 is opened, and an original document to be copied is set on the glass 23. The recording sheet is set on the recording sheet tray 32, and photocopying is made by pushing a start key 12e forming the other end of the panel portion 1 at the end.

Thus, the keys on the panel portion 1 are arranged so that all manipulations are naturally completed without any failure by manipulating from the left side to the right side according to the sequence of the manipulations. As an example for a manipulation method, exemplified is a manipulation for photocopying, but when scanning is chosen with the first function key 12c, scanning operation can be made through a personal computer or the like connected via the USB connector 43 or the like. If photograph operation is selected, the images in the media inserted in the card slot portion 5 described above can be directly recorded with the recording section 3.

As described above, according to the above embodiment, the control substrate 41 is disposed below the image reading section 2 and above the recording section 3, as well as disposed on the rear side of the apparatus body, and the feeding section for feeding recording sheets to the recording section 3 is disposed on the rear side of the apparatus where the power supply 45 is disposed below the feeding section and where the panel portion 1 is disposed in front of the control substrate 41, so that the installation area of the apparatus body can be reduced. The height of the apparatus body also can be suppressed. Some electric devices in the card shape can be inserted and pulled out on the same face as the panel portion, so that the controllability can be improved. The control substrate 41 is located relatively adjacently to the panel portion 1, the power supply 45, and the card substrate 51, so that the connections among them can be made easily.

[Other Embodiments]

Although in the above embodiment, exemplified is a case of using an image recording section using a plurality of recording heads for recording with inks of different colors, this invention is not limited to this structure, and for example, this invention is applicable, in substantially the same way, notwithstanding the number of the recording heads, to such as an image recording section for monochrome recording using a single recording head, and an image recording section for gray scale recording using a plurality of recording heads with inks of the same color but different in density, thereby obtaining substantially the same advantages.

As a recording mode of the recording section, it is preferable to use an apparatus not only having the recording mode only of a main color such as black or the like but also having at least one mode of multicolor or full color made of mixed colors where the recording head is formed by structuring the heads in a united body or a combination of the plural heads.

As a recording means or recording head, any structure of the recording means and ink tanks such as a cartridge type in which the recording head and the ink tanks are integrated, in addition to the structure in which the recording head and the ink tanks are formed as separated bodies and connected via ink supply tubes as in the above embodiment, is applicable in substantially the same way, and the substantially the same advantages can be obtained.

This invention is also applicable effectively to a recording head of a fill line type having a length corresponding to the maximum width of the recording media that the recording apparatus can record. As such a recording head, any head having a structure satisfying that length with the combination of the plural recording heads or a structure of a single head formed unitedly can be used. In addition, this invention is advantageous when using a recording head secured to the apparatus body, a recording head of a replaceable chip type in which electrical connection to and ink supply from the apparatus body are made upon attachment to the apparatus body, and a recording head of a cartridge type in which ink tanks are formed integrally to the recording head itself, even though the recording head is of a serial type as described in the above embodiment.

Although in the above embodiment, exemplified is a method of the inkjet recording as a recording method, this invention is not limited to this and is applicable to recording methods such as a thermal transfer recording method, a thermal sensing recording method, an impact recording method such as a wire-dot recording method, and other recording methods such as an electrophotographic method or the like.

What is claimed is:

1. An image reading and recording apparatus comprising:
    an image reading section for reading an image on an original document;
    an image recording section for recording an image on a recording medium; and
    a control section for controlling the entire apparatus,
    wherein the control section is disposed below the image reading section and above the image recording section and disposed on a rear side of an apparatus body.

2. The image reading and recording apparatus according to claim 1, wherein a feeding section for feeding the recording medium to the image recording section is disposed at a rear of the image recording section, and a power supply portion is disposed substantially below the feeding section.

3. The image reading and recording apparatus according to claim 1, wherein a manipulation portion having various keys is disposed in front of the control section.

4. The image reading and recording apparatus according to claim 1, wherein the control section has a control substrate, and the control substrate is arranged to extend substantially horizontally.

5. The image reading and recording apparatus according to claim 4, wherein a manipulation portion having various keys is disposed in front of the control section, and wherein a power supply portion is disposed below the control substrate so as to sandwich the image recording section with the control substrate.

6. The image reading and recording apparatus according to claim 3, further comprising a card slot portion as an inserting portion for a card-shaped electronic device, wherein the manipulation portion is formed as projecting forward of the apparatus body, and wherein the card slot portion is connected to a lower side of the manipulation portion where the card slot portion and the control portion are at substantially the same level.

7. The image reading and recording apparatus according to claim 6, wherein the card slot portion is arranged to render the card-shaped electronic device capable of being pulled out and inserted so that a surface of the card-shaped electronic device extends substantially parallel to the horizontal surface.

8. The image reading and recording apparatus according to claim 7, wherein the card slot portion has a card substrate as a substrate for the card-shaped electronic device, and wherein the card substrate is formed adjacently to a control substrate of the control section.

9. The image reading and recording apparatus according to claim 1, wherein an original document setting portion formed at the image reading section for receiving the original document from which an image is read, a control substrate of the control section, and a conveyance direction of the recording medium during recording at the image recording section extend substantially parallel.

* * * * *